Patented Oct. 13, 1936

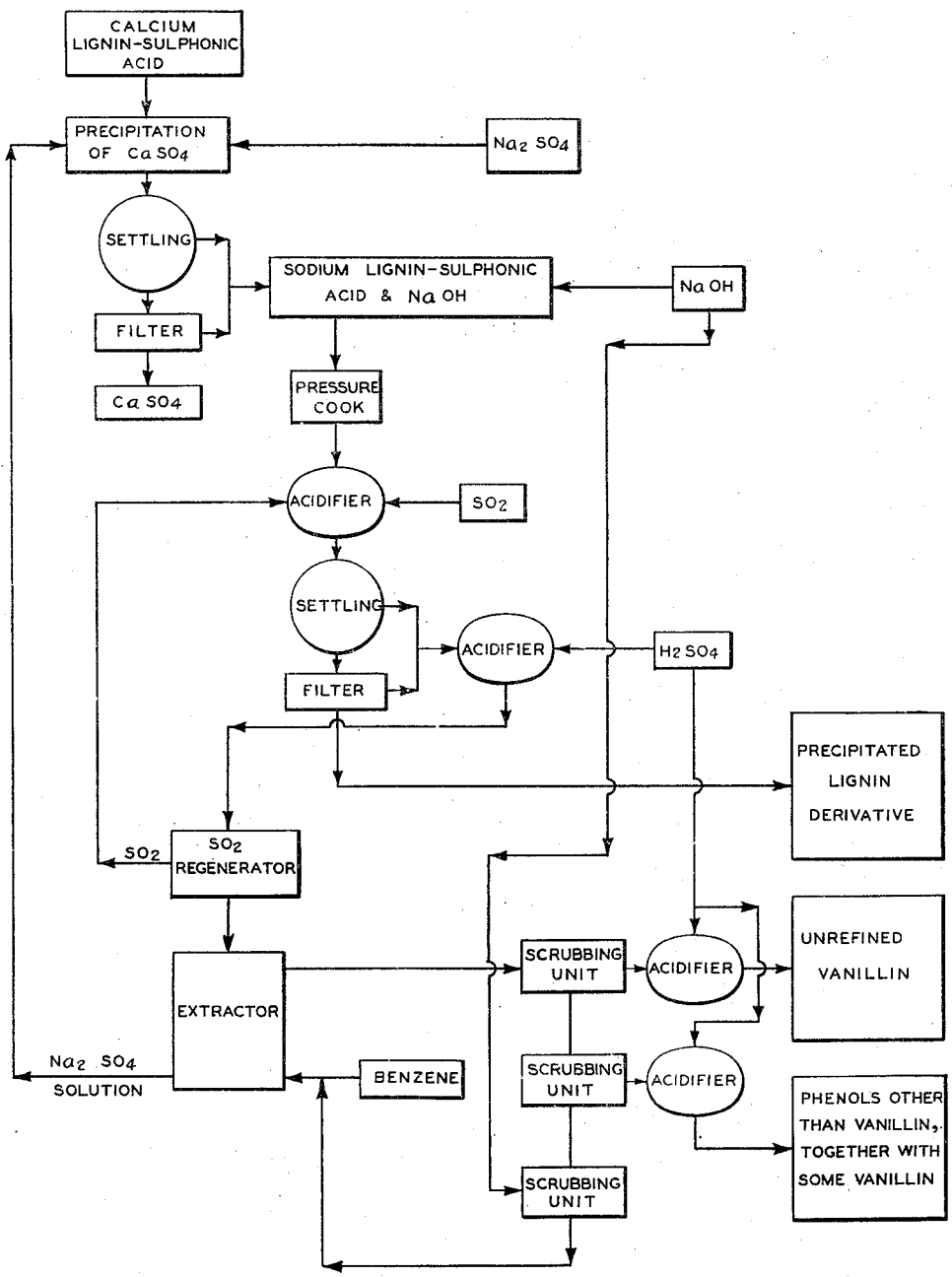

2,057,117

UNITED STATES PATENT OFFICE 2,057,117

PROCESS OF MAKING VANILLIN

Lloyd T. Sandborn, Jörgen Richter Salvesen, and Guy Clemens Howard, Wausau, Wis., assignors to Marathon Paper Mills Company, Rothschild, Wis., a corporation of Wisconsin, and Guy C. Howard Company, Rothschild, Wis., a corporation of Washington Application March 28, 1933, Serial No. 663,180

25 Claims. (Cl. 260—137)

This invention relates to the making of vanillin from lignin substance.

It has been known for many years that lignin substance under various treatment will yield simple phenolic compounds including vanillin, for example, by suitably oxidizing lignin-containing substances such as wood, jute, straw, peat, etc. in acid solution or by heating lignin-containing substances with caustic alkalies vanillin can be produced. Some attempts have been made to recover these phenolic products in commercial forms and the processes have been disclosed by which this is accomplished but most of the available knowledge on the subject has resulted from attempts to determine the structural composition of lignin without regard to the commercial production of such products.

The few existing processes which have been proposed to accomplish the recovery of vanillin from lignin substances are difficult to operate economically, due to various inherent conditions, for example, the yield of vanillin is relatively low and large tonnages of raw material must be handled, the cost of chemical reagents is high, the products are sensitive to alteration and decomposition unless properly controlled conditions are maintained, and the final separation into pure products is difficult.

As a result of an extensive investigation involving many tests, we have discovered an improved process for the manufacture of vanillin and other organic products from lignin substance which is commercially feasible to operate and gives maximum yields of desired products.

Briefly outlined the process preferably includes treating the original material by known methods to give a more concentrated lignin material; then subjecting such lignin material to an alkaline pressure cook in the presence of water and a sufficient quantity of caustic alkali, discharging the cooked solution into a hot solution containing alkali-metal bisulphite salt and having a pH value maintained below 7.0 by the addition of $SO_2$ whereby an organic precipitate is formed and removed as one of the products, and a solution containing a vanillin bisulphite compound and other organic matter is obtained, treating such solution with an acid in slightly excess amount over that required to decompose the inorganic monosulphite and bisulphite salts present, expelling the thereby liberated $SO_2$ for reuse in the process, extracting the resultant solution with an organic solvent, e. g. benzene, to yield an aqueous solution substantially free from vanillin and other benzene soluble organic matter which is treated if desired to recover organic products and to recover inorganic salts for reuse in the process, and a benzene solution of vanillin and other benzene soluble organic matter, treating the benzene solution to recover benzene for reuse in the process, and to separate and recover vanillin and other benzene soluble phenolic products in commercial forms.

We believe any naturally occurring lignin substance such as the lignin component of lignocellulose material is capable of forming vanillin when subjected to an alkaline pressure cook in the presence of water and a sufficient quantity of caustic alkali. Such lignin substance is usually associated with large proportions of non-ligneous matter, and hence is not in the most desirable condition for use as the immediate starting material for our process. For example, wood is not preferred as the immediate starting material by reason of its physical form and the relatively large proportion of non-ligneous matter which it contains.

Some manufactured products which contain normal lignin substance but in more or less chemically altered form are also suitable materials for our process since the lignin substance has not been objectionably altered from its original natural property of yielding vanillin when treated according to our process. For example, the waste sulphite liquor resulting from the pulping of wood by the sulphite process contains lignin substance in the form of a lignin-sulphonic acid compound and in more concentrated condition than wood as regards the amount of associated non-ligneous matter by reason of the cellulose constituent of the wood having been removed as paper pulp. Lignin material in this condition might be used as the immediate starting material for our process but we prefer to first process the waste sulphite liquor in the manner indicated below whereby the lignin substance is still further separated from associated non-ligneous matter and made available in more concentrated condition than the dilute solution in which it exists in the ordinary waste sulphite liquor.

Another example of a manufactured product which might be used as the immediate starting material for our process is the lignin product obtained by treating wood with a strong mineral acid, e. g., $H_2SO_4$, to dissolve out substantially all the non-ligneous constituents of the wood. Such lignin product is in concentrated form but is not preferred as a starting material for our process by reason of its physical condition making it less readily reactive to the pressure cooking treatment with caustic alkali.

A lignin raw material for our process is either a natural ligno-cellulose material, for example wood, or a material derived from ligno-cellulose by a treatment which does not chemically alter its lignin component to such extent as to make the material incapable of yielding vanillin by our process. Such derived material is referred to in the claims by the term "crude lignin extract". In case such a chemical alteration has been brought about we consider that the altered material cannot properly be called a crude lignin material. One example of crude lignin material is waste sulphite liquor.

Another example of crude lignin material derived from natural ligno-cellulose is the basic calcium salt of lignin-sulphonic acid, and this is the preferred form of lignin material for use in our process. Another crude lignin material which may be used is the substance obtained by treatment of ligno-cellulose material with a strong mineral acid to dissolve out non-ligneous constituents in a known way. In principle any natural ligno-cellulose or lignin material derived therefrom by a process which does not destroy its vanillin yielding quality when treated by the procedures of our process may be used, but some lignin materials are more advantageous commercially and preferred for one reason or another.

The raw material we prefer to use is the precipitated lignin substance as obtained from waste sulphite liquor by the procedures covered by U. S. Patents Reissue No. 18,268 and No. 1,856,558, issued to Howard. This is lignin material substantially free from non-ligneous organic matter and is in the form of a basic calcium salt of lignin-sulphonic acid. In said reissue patent it is described as a yellow flocculated precipitate with some inorganic crystals which is recovered at a filter D₂, and in said Patent No. 1,856,558 as a mixture of inorganic crystals and yellow flocculated organic matter which is recovered at a filter F. We prefer to use this raw material because it is a relatively cheap source of concentrated lignin substance and because there are economic advantages in using a lignin material which is substantially free from non-ligneous organic matter rather than using, for example, the whole waste sulphite liquor which contains substantial amounts of non-ligneous organic matter associated with the lignin substance. While we prefer this lignin substance in the form of a calcium salt of lignin-sulphonic acid we do not wish to confine ourselves to the use of lignin in this form as the process is applicable to other forms of lignin substance.

We will now describe our process in detail as applied to the treatment of the preferred lignin material in the form of the basic calcium salt of lignin-sulphonic acid substantially free from non-ligneous organic matter. This will disclose the essential procedures of our process and enable those skilled in the art to adapt it to the use of other forms of lignin substance.

The accompanying drawing shows diagrammatically a flow sheet of the process using as raw material calcium lignin-sulphonic acid.

Step 1

The basic calcium salt of lignin-sulphonic acid is normally obtained under the above cited Howard patents as a wet solid which is alkaline with caustic lime. We mix this solid with a solution containing sodium sulphate, or other alkali-metal salt capable of precipitating a calcium salt, in an amount preferably in slight excess over the equimolecular equivalent of the total CaO content of the lignin substance used and whereby a soluble sodium salt of lignin-sulphonic acid is formed and $CaSO_4$ or other insoluble calcium salt is precipitated. The mixture is preferably heated and stirred to facilitate the reaction and the system is kept as concentrated as practical and still allow the subsequent settling and removal of the precipitated calcium salt. For example, we find this settling can be accomplished in a solution containing 200 grams per litre of the lignin-sulphonic acid salt.

Sodium sulphate for the above purpose can be readily recovered from subsequent steps in the process as will be indicated and hence is ordinarily preferred as the reagent for this removal of calcium salt.

This Step 1 and subsequent Step 2 are unnecessary in case an alkali-metal salt of lignin-sulphonic acid is available for use as the starting material or in case lignin in some form other than its sulphonic acid compound is used as for example when the lignin material is obtained by treatment of wood by a strong mineral acid as heretofore described.

Step 2

The precipitated calcium salt, e. g. $CaSO_4$, is separated and removed from the preferably hot solution by ordinary means such as sedimentation or filtration. The removal of the precipitated calcium salt is especially important if, as in the case of $CaSO_4$, it is capable of reaction with NaOH to thereby increase the amount of that reagent required in subsequent steps in the process. If the precipitated calcium salt, e. g. $CaCO_3$ or $CaSO_3$ such as will result if $Na_2CO_3$ or $Na_2SO_3$ are used instead of $Na_2SO_4$ in Step 1, will not react appreciably with NaOH its removal is not as important.

Step 3

A hydroxide of an alkali metal e. g. NaOH is added to the resultant solution in the necessary amount, e. g. equal to 25% by weight of the lignin substance present. The caustic alkali is preferably added in solid form or as a concentrated solution to avoid unnecessary dilution. The above indicated amount of caustic soda reagent is found sufficient when working with this preferred starting material but additional amounts are required when material quantities of non-ligneous organic matter are associated with the lignin substance, e. g. if wood or the whole waste sulphite liquor is used as a starting material. It is therefore most economical to use lignin material substantially free from non-ligneous organic matter but the process is not limited to such selected starting materials. An additional amount of caustic alkali is also required dependent on the amount and character of the calcium salts which may be present in the system due to their incomplete removal in Step 2.

Step 4

The resultant caustic alkaline solution is then cooked under suitable pressure, e. g. 130 to 200 lbs. steam pressure, and for a proper time, e. g. ½ to 1½ hours. This can be carried out either in a continuous flow cooking apparatus or in separate charges in a pressure vessel.

The steam pressure (and its resultant temperature) and the duration of cooking we find are vital factors in determining the character of phenolic products formed and their respective yields.

We have found that vanillin and other phenolic products are formed whenever lignin, ligno cellulose, crude material derived therefrom, or the sodium salt of lignin-sulphonic acid, is heated with caustic alkali in sufficient amount and that in general the total yield of the phenolic products can be increased by increasing the cooking temperature of the alkaline solution. We have found, however, that if the steam pressure is carried appreciably above 200 lbs. the resulting phenolic product contains a lower proportion of vanillin.

We have also found that within the temperature range defined by a steam pressure of 130 to 200 lbs. the reactions involved in the formation of vanillin from lignin by heating in caustic alkaline solution are rapid and that the maximum yield of vanillin is obtained in from ½ to 1½ hours and in general prolonging the heating period at any given temperature tends to decrease the vanillin yield even though the total yield of phenolic substances is increased.

While we believe that the maximum yield of vanillin is obtained by cooking the alkaline solution at temperatures equivalent to 130 to 200 lbs. steam pressure, the production of vanillin is not limited to this temperature range. By cooking at lower temperatures a somewhat decreased yield of vanillin is obtained, and at higher temperatures, even though the total yield of phenolic products is increased, the vanillin yield is decreased and purification of the vanillin becomes more difficult.

Step 5

The cooked alkaline solution is then acidified with sulphurous acid, sulphur dioxide, or an alkali metal bisulphite salt. Sulphurous acid, solutions of sulphur dioxide, and bisulphite salts are of acid reaction, contain hydrogen sulphite ions ($HSO_3$), and are equivalents in our process. When sulphurous acid or sulphur dioxide is introduced into the solution a bisulphite salt is formed. We have found it best to accomplish this acidification by discharging the solution, preferably thru a heat exchanger in which the alkaline solution to be cooked is preheated, directly into a hot and stirred solution containing an alkali-metal bisulphite salt and the pH value of which is kept below 7.0 by the concurrent addition thereto of $SO_2$. This simultaneously effects a precipitation of flocculated organic matter and converts the vanillin constituent of the cooked liquor into its soluble bisulphite compound. The temperature of the mixture is controlled by the rate of addition and temperature of the cooked solution and by the heat of neutralization of the NaOH present. Normally the temperature of the mixture is kept at 80 to 95° C. Although it is possible to precipitate the organic matter in the cold without stirring, we have found that heat and stirring are favorable conditions to properly flocculate this precipitate and thereby facilitate its subsequent separation from the solution. While it is possible to acidify the alkaline liquor by passing $SO_2$ into the whole cooked charge without decreasing the vanillin yield, we have found that when acidified in this manner the mixture passes through a pasty semi-solid stage while still alkaline making manipulation difficult. If the mixture contains carbonates there is also difficulty from foaming when the mixture becomes acidic. Both these difficulties are avoided by discharging the alkaline solution at a controlled rate into an acidified mixture as described above.

Step 6

The precipitated organic matter is separated from the hot liquor by sedimentation and filtration and washed with a minimum of water. It contains around 75% of the organic matter existing in the original calcium lignin-sulphonic acid salt but this percentage will necessarily vary depending on the nature of the lignin starting material.

The removal of this substantial amount of organic matter from the system greatly facilitates subsequent steps in the process and reduces their expense. Furthermore we find the precipitation of such organic matter in Step 5 by sulphurous acid, rather than any other acid, is essential to a maximum yield of vanillin in that it facilitates its removal from the precipitated organic matter by reason of the conversion of vanillin, which is very reactive chemically and only moderately soluble in water, into its comparatively stable and exceedingly soluble bisulphite compound.

The organic matter thus precipitated and separated from the solution is an acid insoluble lignin derivative and may be used as a fuel or for other purposes.

Step 7

The resultant filtrate now contains a materially reduced amount of organic matter and is free from suspended solids. The vanillin constituent is present as the sodium salt of its bisulphite compound. The solution also contains sodium bisulphite and normally some sodium monosulphite and other inorganic salts depending on the specific conditions obtaining in Step 5. A suitable acid, e. g. $H_2SO_4$, is now added to this solution in preferably slight excess amount over that needed to decompose the inorganic bisulphite and monosulphite salts present and to decompose the sodium bisulphite regenerated from the vanillin bisulphite compound in this and subsequent steps in the process. A reasonable excess amount of the acid over this requirement is not particularly detrimental but is unnecessary and wasteful of acid but this minimum amount is necessary to properly release the vanillin from its bisulphite compound and make possible the subsequent steps in the process. A suitable acid is one capable of decomposing mono- and bisulphite salts with liberation of $SO_2$. We prefer $H_2SO_4$ in order that the sodium may be recovered as $Na_2SO_4$ for use in Step 1 of the process, as described.

Step 8

Substantially all of the $SO_2$ liberated by the above acid addition is now expelled from the solution by suitable means, for example by heating, and the $SO_2$ collected for reuse in Step 5 of the process.

Step 9

The resultant solution, substantially free from $SO_2$ and while still hot, is then extracted with benzene or other usual water insoluble organic solvent for vanillin to yield a benzene phase containing vanillin and other benzene soluble constituents and an aqueous phase practically free from vanillin and other benzene soluble compounds. The benzene phase is treated by Step 10. The aqueous phase is normally concentrated and refrigerated to recover $Na_2SO_4$ for use in Step 1 and the mother liquor can, if desired, be treated for the recovery of organic products. We preferably carry out the extraction by counter current flow of the solution and solvent in two or more receptacles in which an intimate mixture of the two phases is accomplished and with intermediate separations of the solvent and solution.

Benzene is the solvent preferred but other known water insoluble organic solvents for vanillin may be used if desired. The requirements for a suitable solvent are insolubility or low solubility in water, ability to dissolve vanillin, inertness to chemical reaction with constituents in the solution, sufficiently high boiling point to avoid loss by evaporation and it should not give permanent emulsions when used in extracting the solutions. In using benzene as the solvent an elevated temperature is desirable because vanillin is much more soluble in hot than in cold benzene.

Step 10

The resultant benzene solution is then treated to recover benzene for reuse in Step 9 and to separate and isolate vanillin and other phenolic products which are substantially free from vanillin.

The crude vanillin containing, for example 25% of organic products other than vanillin can be recovered by distilling off the benzene or even better by washing the benzene solution with a suitable amount of NaOH solution whereby the benzene is recovered without evaporation. In either case the crude vanillin must be purified further. This purification may be accomplished by treating the crude products with concentrated bisulphite solution to convert the vanillin into its bisulphite compound, extracting the organic products other than vanillin with suitable solvent, e. g. benzene, then decomposing the bisulphite compound and precipitating vanillin by addition of an acid, e. g. $H_2SO_4$. While this is feasible we have found it more economical to pass the benzene solution from Step 9 through a series or train of scrubbing units in which it is washed with dilute NaOH solution in such a manner as to give one portion of the NaOH solution containing vanillin relatively free from other organic matter, another portion of NaOH solution containing both vanillin and non-aldehydic phenolic products, and benzene suitable for reuse in Step 9 is recovered. This improved process results from our discovery that there is a differential in the facility with which vanillin as compared with the accompanying non-aldehydic, benzene soluble phenolic constituents transfer from benzene to NaOH solution and vice versa and that as the NaOH is used up by the reaction with acidic material the non-aldehydic phenolic products tend to carry on into the subsequent scrubbing units more readily than the vanillin. As the washing is continued the non-aldehydic phenolic matter is more or less completely removed from the first unit and absorbed in subsequent units and it is possible, after the washing has continued for a proper length of time, to withdraw an alkaline solution containing relatively pure vanillin from the first unit. A relatively pure benzene for reuse in Step 9 can be withdrawn from the last scrubbing unit and an alkaline solution containing a mixture of vanillin and other phenolic substances relatively rich in the latter can be withdrawn from an intermediate unit. For example, in one case where only two scrubbing units were used and the material dissolved in the benzene was 78% vanillin and 22% other phenolic substance we regenerated substantially pure benzene and found that the first unit yielded vanillin of 92% purity and the second unit vanillin of 63% purity.

Ordinarily we pass the benzene continuously through the washing units in counter current direction to the travel of the NaOH solution and withdraw the respective NaOH solutions periodically but the operation may be carried out in any other manner to accomplish the purpose.

The solution enriched in vanillin as withdrawn from the first unit is mixed with a cold acid solution, e. g. $H_2SO_4$, the two solutions being mixed at such rate as to maintain a slight acidity in the resultant mixture, whereby vanillin is precipitated, separated from the solution, and if desired purified further by recrystallization, distillation or sublimation.

The enriched solution of phenolic substances other than vanillin as withdrawn from the intermediate unit is treated so as to recover both vanillin and such other substances. We prefer to do this by acidifying the alkaline solution with $SO_2$ to form the vanillin bisulphite compound and extracting the said other substances with a solvent suitable for such extraction as hereinbefore disclosed, e. g. benzene. We then liberate and precipitate the vanillin by decomposing the vanillin bisulphite compound with acid, e. g. $H_2SO_4$. The non-aldehydic phenolic material is recovered from the solvent extract by ordinary means, e. g. by evaporation of the solvent or by again washing with NaOH solution. The products thus recovered are a mixture of various non-aldehydic, benzene soluble phenolic substances, for example guaiacol and other phenols, and may be used as such.

The yield of vanillin obtained by our process will vary some depending on the lignin starting material and its previous history but we have consistently obtained vanillin in amounts equivalent to from 2 to 3% of the lignin substance in the starting material. The process also yields the non-aldehydic phenolic products in material amounts and the major portion of the original lignin substance is recovered in the form of an acid insoluble lignin derivative as precipitated and removed in Steps 5 and 6. The aqueous mother liquor after recovery of $Na_2SO_4$, in Step 9 is also a source of additional organic products.

We claim:

1. A process of making vanillin in which a material selected from the group consisting of lignocellulose, crude lignin extract and a lignin-sulphonic acid compound is heated under pressure with water and an alkali metal hydroxide, and the resulting mixture acidified with sulphurous acid to precipitate flocculated organic matter and to convert the vanillin constituent into a soluble bisulphite addition compound.

2. A process of making vanillin in which a material selected from the group consisting of lignocellulose, crude lignin extract and a lignin-sulphonic acid compound is heated under pressure with water and an alkali metal hydroxide, and the resulting mixture added to an alkali metal bisulphite solution the pH value of which is maintained below 7.0 by the addition of $SO_2$ to precipitate flocculated organic matter and to convert the vanillin constituent into a soluble bisulphite addition compound.

3. A process of making vanillin in which an alkali metal salt of lignin sulphonic acid in aqueous solution is heated under pressure with an alkali metal hydroxide and the resulting mixture acidified with a reagent containing hydrogen sulphite ions ($HSO_3$) to simultaneously precipitate flocculated organic matter and to convert the vanillin constituent into a soluble bisulphite addition compound and separating said organic matter from the vanillin containing solution.

4. The process of claim 3 in which the material which is heated under pressure with caustic alkali is substantially free from non-ligneous organic matter.

5. A process of making vanillin in which an alkali metal salt of lignin sulphonic acid in aqueous solution is heated under pressure with an alkali metal hydroxide, and the resulting mixture added to an alkali metal bisulphite solution the pH value of which is maintained below 7.0 by the addition of $SO_2$ during the addition of the said mixture.

6. A process of making vanillin in which a calcium salt of lignin-sulphonic acid is treated in presence of water with an alkali-metal salt capable of precipitating a calcium salt, whereby such precipitate and an alkali-metal salt of lignin-sulphonic acid are produced, separating out the precipitate, heating under pressure the alkali-metal salt of lignin-sulphonic acid in aqueous solution with an alkali-metal hydroxide, acidifying the resulting mixture with a reagent containing hydrogen sulphite ions ($HSO_3$) to precipitate flocculated organic matter, and to convert the vanillin constituent into a soluble bisulphite addition compound, and to form alkali-metal bisulphite.

7. The process of claim 6 in which the alkali-metal salt for the treatment of the calcium salt of lignin-sulphonic acid prior to the pressure cook is sodium sulphate.

8. The process of claim 6 in which the calcium salt of lignin-sulphonic acid is substantially free from nonligneous organic matter, and the alkali-metal salt for treating it prior to the pressure cook is sodium sulphate.

9. The process of making vanillin which comprises cooking with alkali metal hydroxide and water, a material selected from the group consisting of ligno-cellulose, crude lignin extract and a lignin-sulphonic acid compound acidifying the cooked mixture with a solution of alkali-metal bisulphite salt maintained at a pH value below 7.0 and thereby simultaneously obtaining an organic precipitate and an aqueous solution of bisulphite addition compound of vanillin, separating the precipitate from the solution, adding to the solution a strong acid to decompose said vanillin compound and liberate $SO_2$, expelling practically all the liberated $SO_2$, extracting the resultant acid solution with water-insoluble organic solvent for vanillin, whereby an organic-solvent phase containing vanillin and an aqueous phase substantially free from vanillin are obtained, and separating said phases from each other.

10. The process of making vanillin which comprises cooking with alkali metal hydroxide and water, a material selected from the group consisting of ligno-cellulose, crude lignin extract and a lignin-sulphonic acid compound acidifying the cooked mixture with a solution of alkali-metal bisulphite salt maintained at a pH value below 7.0 and thereby simultaneously obtaining an organic precipitate and an aqueous solution of bisulphite addition compound of vanillin, separating the precipitate from the solution, adding to the solution a strong acid to decompose said vanillin compound and liberate $SO_2$, expelling practically all the liberated $SO_2$, extracting the resultant acid solution with benzene, whereby a benzene phase containing vanillin and an aqueous phase substantially free from vanillin are obtained, and separating said phases from each other.

11. The process of claim 10 in which the benzene phase is washed with a caustic alkali solution to yield benzene substantially free from vanillin and an aqueous alkaline solution containing vanillin, and in which vanillin is recovered from said solution.

12. The process of claim 10 in which the benzene solution is washed with a solution of an alkali metal hydroxide in a series of scrubbing units to yield a vanillin enriched alkaline solution, an enriched alkaline solution of benzene soluble phenolic substance other than vanillin and benzene.

13. The process of claim 10 in which the benzene solution is washed with a solution of an alkali metal hydroxide in a series of scrubbing units to yield a vanillin enriched alkaline solution, an enriched alkaline solution of benzene soluble phenolic substance other than vanillin and benzene, and in which said enriched solutions are separately treated to yield substantially pure vanillin and benzene soluble phenolic substances other than vanillin and substantially free from vanillin.

14. A process of making vanillin in which a material selected from the group consisting of ligno-cellulose, crude lignin extract and a lignin-sulphonic acid compound is heated under pressure with water and an alkali-metal hydroxide, and the resulting mixture acidified with a reagent containing hydrogen sulphite ions ($HSO_3$) to simultaneously precipitate flocculated organic matter and to convert the vanillin constituent into a soluble bisulphite addition compound and separating said organic matter from the vanillin containing solution.

15. The process of claim 14 in which the material treated is selected from the group consisting of ligno-cellulose, crude lignin extract and a lignin-sulphonic acid compound and substantially free from non-ligneous organic matter.

16. The process of making vanillin in which a material selected from the group consisting of ligno-cellulose, crude lignin extract and a lignin-sulphonic acid compound is heated under pressure with water and an alkali-metal hydroxide, and the resulting mixture treated with an alkali metal bisulphite to simultaneously precipitate flocculated organic matter and to convert the vanillin constituent into a soluble bisulphite addition compound and separating said organic matter from the vanillin containing solution.

17. In a process of making vanillin, cooking under pressure with the hydroxide of an alkali metal a material selected from the group consisting of ligno-cellulose, crude lignin extract and a lignin-sulphonic acid compound acidifying the hot cooked liquid with sufficient sulphurous acid to produce a bisulphite addition compound of vanillin and to precipitate flocculated organic matter, and separating solids from liquid.

18. The process of claim 17 in which the final liquid is treated with a strong acid to decompose the bisulphite addition product of vanillin, and the vanillin thereupon extracted by a water insoluble organic solvent for vanillin.

19. A process of separating vanillin from a benzene solution of vanillin and phenolic substances other than vanillin which comprises treating the benzene solution with a solution of the hydroxide of an alkali metal and separating the benzene therefrom, acidifying the resultant liquid with a reagent containing hydrogen sulphite ions (HSO₃) to form a water-soluble bisulphite addition product of vanillin, and to free the phenolic substances other than vanillin, extracting with benzene the phenolic substances other than vanillin and thereupon separating the aqueous phase containing the bisulphite addition product of vanillin from the benzene phase containing phenolic substances other than vanillin.

20. The process of making vanillin which comprises subjecting a material selected from the group consisting of ligno-cellulose, crude lignin extract and a lignin-sulphonic acid compound to a pressure cook under conditions of caustic soda alkalinity, acidifying the resulting mixture by means of sulphurous acid to form a mixture of sodium bisulphite, a soluble bisulphite compound of sodium and vanillin and a precipitate of a lignin derivative, separating out said precipitate and treating the resulting liquid with sulphuric acid to liberate sulphurous acid.

21. The process of the last preceding claim in which the sulphurous acid liberated by sulphuric acid is recovered as sulphur dioxide and used in a cyclic process for acidifying an additional quantity of the caustic soda cooked mixture.

22. A process of purifying vanillin which comprises dissolving in benzene vanillin and other benzene soluble phenolic substances obtained from a material selected from the group consisting of ligno-cellulose, crude lignin extract and a lignin-sulphonic acid compound and washing the resulting benzene solution with a solution of an alkali metal hydroxide in a series of scrubbing units to yield a vanillin enriched alkaline solution, an enriched alkaline solution of benzene soluble phenolic substances other than vanillin and benzene for reuse in the process.

23. A process of making vanillin which comprises treating a calcium salt of lignin sulphonic acid with sodium sulphate to produce calcium sulphate and a sodium salt of lignin sulphonic acid, separating out the precipitated calcium sulphate and subjecting said sodium salt of lignin sulphonic acid in aqueous solution to a pressure cook in presence of sodium hydroxide, treating the cooked material with a reagent containing hydrogen sulphite ions (HSO₃) to lower its pH value below 7.0 with formation of bisulphite of sodium and a bisulphite addition product of vanillin and to precipitate flocculated organic matter, separating solids from liquid, reacting upon the liquid with sulphuric acid to decompose bisulphite compounds with liberation of vanillin and formation of sodium sulphate and recovering said sodium sulphate and using same for the treatment of a new quantity of calcium salt of lignin sulphonic acid.

24. The process of making vanillin which comprises treating waste sulphite liquor with solid phase caustic lime to obtain lignin substances in solid form substantially free from non-ligneous substances, treating said lignin substance with sodium sulphate to form a sodium base lignin substance and calcium sulphate, treating the sodium base lignin substance in aqueous solution with NaOH to form a mixture of vanillin and reaction products, acidifying said mixture with sulphurous acid to form bisulphite of sodium and a bisulphite addition product of vanillin and an organic precipitate, separating solids from liquid, adding sufficient sulphuric acid to the resulting liquid to liberate sulphurous acid and vanillin with formation of sodium sulphate, and recovering said sulphate for use in treating fresh quantities of said lignin substance.

25. The process of making vanillin which comprises treating waste sulphite liquor with solid phase caustic lime to obtain a calcium base lignin substance in solid form substantially free from non-ligneous substances, converting said calcium base lignin substance into a water soluble sodium base lignin substance and an insoluble calcium salt, and subjecting said soluble lignin substance to a pressure cook under conditions of caustic soda alkalinity.

LLOYD T. SANDBORN.
JÖRGEN RICHTER SALVESEN.
GUY CLEMENS HOWARD.